United States Patent [19]

Schechter

[11] Patent Number: 6,071,547

[45] Date of Patent: Jun. 6, 2000

[54] TEXTURED DRY MIX INSTANT NUTRITIONAL DRINK

[75] Inventor: Steven M. Schechter, Manalpan, N.J.

[73] Assignee: Superior Nutrition Corporation, Manalapan, N.J.

[21] Appl. No.: 09/168,242

[22] Filed: Oct. 8, 1998

[51] Int. Cl.⁷ .................................................. A23L 2/00
[52] U.S. Cl. ........................ 426/590; 426/573; 426/580; 426/601; 426/656; 426/658
[58] Field of Search ..................................... 426/590, 601, 426/580, 573, 656, 658

[56] References Cited

U.S. PATENT DOCUMENTS

| 5,202,145 | 4/1993 | Wisler et al. | 426/590 |
| 5,607,714 | 3/1997 | Connolly | 426/590 |
| 5,700,513 | 12/1997 | Mulchandani et al. | 426/590 |

FOREIGN PATENT DOCUMENTS

| 34535 | 5/1995 | WIPO . | |

OTHER PUBLICATIONS

The Junior League of Macon, Inc., Gracious Goodness, Wimmer Brothers Fine Printing and Lithography, Memphis, TN, p. 51, Oct. 1981.

*Primary Examiner*—Helen Pratt
*Attorney, Agent, or Firm*—Hedman, Gibson & Costigan, P.C.

[57] ABSTRACT

A dry mix formulation for a nutritional drink is disclosed which has the following ingredients:

(a) a source of protein;
(b) a non-dairy creamer which comprises a low melting fat, sodium caseinate and corn syrup solids;
(c) a vegetable gum;
(d) a dispersant;
(e) optionally, a source of carbohydrates;
(f) a comestible organic acid; and
(g) optionally a vitamin-mineral mixture.

11 Claims, No Drawings

TEXTURED DRY MIX INSTANT NUTRITIONAL DRINK

BACKGROUND OF THE INVENTION:

The present invention relates to a flavored instant, highly textured nutritional drink which may be formulated as a dry mix which may be mixed with water. In the prior art, powdered beverage concentrates have been described which have contained proteins and sugars derived from cow's milk. Some of these compositions have been described in U.S. Pat. No. 4,748,040; U.S. Pat. No. 4,337,278 and U.S. Pat. No. 4,876,106.

The dry drink mixes of the prior art which have contained both protein and a fruit flavor have not been instantly dispersible in water to form a frothy beverage without the use of a high shear mixing device such as a blender.

The applicant has discovered a dry mix for a nutritional drink which comprises, protein, vitamins, minerals and is instantly dispersible in aqueous liquids such as cold water, fruit juice or vegetable juice and results in a low-fat, highly textured beverage.

SUMMARY OF THE INVENTION

The invention provides a novel dry mix formulation for a textured nutritional drink which comprises:
(a) a source of protein;
(b) a non-dairy creamer which comprises a low melting fat, sodium caseinate and corn syrup solids;
(c) a vegetable gum;
(d) a dispersant;

DETAILED DESCRIPTION OF THE INVENTION

The protein component of the nutritional drink of the invention comprises 15 to 3 wt % of the dry mix and it may be derived from casein, egg albumin, meat protein, gelatin, soy bean isolate (enzyme modified) obtained from animal or vegetable sources. Ultrafiltered, spray dried and agglomerated sweet dairy whey from cow's milk is preferred as the main protein source with from about 1 to 3 wt % of the dry mix being soy protein obtained by enzymatically hydrolyzed soy flour which is available as Versa Whip 600K from Quest International. In additional to its role as a nutrient in the drink mix of the invention, the protein adds texture and creaminess while acting as a suspension stabilizer even under the acidic pH of the drink mix.

The non-dairy creamer may comprise:
(a) from 10 to 40 wt %, based on the total weight of the non-dairy creamer, of a low melting fat (less than 80° F.);
(b) from 45 to 75 wt %, based on the total weight of the non-dairy creamer, of a carbohydrate source;
(c) from 3 to 15 wt %, based on the total weight of the non-dairy creamer, of sodium caseinate; and
(d) from 0–10 wt %, based on the total weight of the non-dairy creamer, of a gum. The non-dairy creamer may comprise from 15 to 30 wt % of the total weight of the dry mix.

The low melting fat may comprise a partially hydrogenated vegetable oil such as coconut oil, cottonseed oil, palm kernel oil, soybean oil, canola oil, palm oil or mixtures thereof. Generally fats with a melting point below about 35° F. should be avoided.

The carbohydrate source for the non-dairy creamer subcomponent of the invention or the dry mix may comprise maltose, dextrose, glucose, sucrose, corn syrup solids and mixtures thereof. Corn syrup solids are preferred. The carbohydrate component of the nutritional dry will comprise from about 40 to 60 wt % of the total weight of the dry mix.

If a gum is employed in the non-dairy creamer, acacia, agar, carrageenan, sodium alginate, xanthan gum or cellulosic gums such as methyl cellulose, hydroxy ethyl cellulose, hydroxypropyl cellulose, hydroxypropyl methylcellulose, and mixtures thereof. The gums also include carboxymethylcellulose which is the preferred gum.

The dry mix may also contain from 0.1 to 1 wt % of the gum, based on the total weight of the dry mix, as a stabilizer.

A comestible organic acid may be added in an amount of 1 to 3 wt %, based on the weight of the dry mix to provide a pH of about 3.3–4.0 in the product produced when the dry mix is added to water or a juice. The organic acids include malic acid, tartaric acid, fumaric acid, citric acid and mixtures thereof. The acid is added to improve the taste of the nutritional beverage and to mask the taste of the vitamins which are added to the drink mix.

Fiber such as soluble fiber derived from gum acacia pine fiber, oat fiber and the like in an amount of 2 to 10 wt % based on the total weight of the drink mix.

Certified color may be added to obtained the desired color in the final product.

The dispersant may be any food grade acceptable dispersant such as soya lecithin, polysorbate 20, polysorbate 40, polysorbate 60, polysorbate 80 and the like. It may be used in an amount of 0.1 to 1 wt % based on the weight of the dry mix.

The following preferred vitamin-mineral formula may be added to provide in each 300 ml of nutritional drink which is made with 50 g. of the dry concentrate.

| | |
|---|---|
| Vitamin A | 1000.00 IU |
| Vitamin C | 60.00 mg |
| Calcium (as dicalcium phosphate) | 300.00 mg |
| Iron (ferric orthophosphate) | 4.50 mg |
| Vitamin D | 80.00 IU |
| Vitamin E | 6.00 IU |
| Thiamin (Vitamin B1) | .34 mg |
| Riboflavin (Vitamin B2) | 4.00 mg |
| Niacin | .40 mg |
| Vitamin B6 | 0.70 mg |
| Folate (Folic Acid) | 0.08 mg |
| Vitamin B12 | 1.20 mcg |
| Pantothenic Acid | 200.00 mg |
| Iodine | 30.00 mcg |
| Zinc | 3.00 mg |
| Copper | 0.40 mg |

The preferred formula will have when it is made with water the following nutritional content in each 300 ml (made with 50 .g of concentrate):

| | |
|---|---|
| Total Fat | 4 g |
| Saturated Fat | 1 g |
| Cholesterol | 15 mg |
| Sodium | 85 mg |
| Potassium | 125 mg |
| Total Carbohydrate | 33 g |
| Dietary Fiber | 1 g |
| Sugars | 26 g |
| Protein | 8 g |

The drink mix is formulated so that about 50 g. of dry drink mix will be added to about 240 ml of aqueous liquid to prepare the nutritional drink of the invention.

Generally tap water may be added to the dry mix of the invention but other aqueous liquids such as seltzer water, club soda, ginger ale, cherry soda, cherry juice, cranberry juice, orange juice, apple juice, tomato juice and the like may be used. The aqueous liquid is preferably added at a temperature of about 40° F. but temperatures approximating room temperature may also be used.

The nutritional drink mix may be prepared by adding all of the ingredients to a suitable mixing device and mixing the ingredients in powder form until a homogeneous composition is obtained or by mixing with water and shake for 5 to 10 seconds.

EXAMPLE

A dry nutritional drink mix is formulated with the following ingredients:

| Ingredient | wt % |
| --- | --- |
| Sucrose | 48.74 |
| Cold water soluble creamer | 23.39 |
| Whey protein concentrate | 17.76 |
| Vitamin/Mineral Mix | 2.40 |
| Citric Acid | 1.80 |
| Enzyme Modified Soy Protein | 1.65 |
| Carboxy Methyl Cellulose | 1.00 |
| Natural Orange Flavor (Dragoco) | 0.90 |
| Natural Color (Or. Sun. W. Jenk.) | 0.70 |
| Monocalcium Phosphate | 0.58 |
| Potassium Citrate | 0.24 |
| Flow Agent (Colloidal silicon dioxide) | 0.16 |
| Sweetener (acesulfame potassium) | 0.03 |
|  | 100% |

I claim:

1. A dry mix formulation for a nutritional drink which comprises:
(a) from 15 to 30 wt % of a source of protein;
(b) from 15 to 30 wt % of a non-dairy creamer which comprises a low melting fat, sodium caseinate and corn syrup solids;
(c) from 0.1 to 1 wt % of a vegetable gum;
(d) from 0.1 to 1 wt % of a dispersant; and
(e) from 1 to 3 wt % of a comestible organic acid.

2. A dry mix formulation for a nutritional drink as defined in claim 1 wherein the source of protein comprises casein, egg albumin, meat protein, gelatin or soy protein.

3. A dry mix formulation for a nutritional drink as defined in claim 1 wherein the non-dairy creamer comprises:

(a) from 10 to 40 wt %, based on the total weight of the non-dairy creamer, of a low melting fat;
(b) from 45 to 75 wt %, based on the total weight of the non-dairy creamer, of a carbohydrate source;
(c) from 3 to 15 wt %, based on the total weight of the non-dairy creamer, of sodium caseinate; and
(d) from 0–10 wt %, based on the total weight of the non-dairy creamer, of a gum.

4. A dry mix formulation for a nutritional drink as defined in claim 1 which includes a carbohydrate which is selected from the group consisting of maltose, dextrose, glucose, sucrose, corn syrup solids and mixtures thereof.

5. A dry mix formulation for a nutritional drink as defined in claim 1 wherein the organic acid is selected from the group consisting of malic acid, tartaric acid, fumaric acid, citric acid and mixtures thereof.

6. A dry mix formulation for a nutritional drink as defined in claim 1 wherein the dispersant is lecithin.

7. A dry mix formulation for a nutritional drink as defined in claim 1 which includes an effective amount of a vitamin-mineral mixture.

8. A nutritional drink which comprises the formulation of claim 1 in an aqueous liquid.

9. A nutritional drink which comprises the formulation of claim 7 in an aqueous liquid.

10. A dry mix formulation for a nutritional drink which comprises:
(a) from 15 to 30 wt % of protein obtained by spray drying sweet dairy whey;
(b) from 15 to 30 wt % of a non-dairy creamer which comprises a low melting fat, sodium caseinate and corn syrup solids;
(c) from 0.1 to 1 wt % of a vegetable gum;
(d) from 0.1 to 1 wt % of a dispersant;
(e) from 40 to 60 wt % of a source of carbohydrates;
(f) from 1 to 3 wt % of a comestible organic acid; and
(g) an effective amount of a vitamin-mineral mixture.

11. A nutritional drink which comprises the formulation of claim 10 and an aqueous liquid.

* * * * *